TAPE PULL BACK MECHANISM FOR PRINTING TELEGRAPH APPARATUS

Filed Sept. 24, 1957

2 Sheets-Sheet 1

INVENTOR
JEROME L. DEBOO

BY R. C. Lerry
ATTORNEY

June 20, 1961 J. L. DE BOO 2,989,590

TAPE PULL BACK MECHANISM FOR PRINTING TELEGRAPH APPARATUS

Filed Sept. 24, 1957 2 Sheets-Sheet 2

INVENTOR
JEROME L. DEBOO

BY R.C. Terry
ATTORNEY

United States Patent Office 2,989,590
Patented June 20, 1961

2,989,590

TAPE PULL BACK MECHANISM FOR PRINTING TELEGRAPH APPARATUS

Jerome L. De Boo, Barrington, Ill., assignor to Teletype Corporation, Chicago, Ill., a corporation of Delaware
Filed Sept. 24, 1957, Ser. No. 685,932
6 Claims. (Cl. 178—17)

This invention relates to an apparatus for handling intelligence bearing tape and more particularly to a tape reader capable of storing a predetermined amount of tape and retracting a portion of the stored tape for a re-run past the sensing elements ef the reader.

In data processing, printing telegraph, and kindred fields where intelligence bearing tapes are used as an information storing means, a need has arisen for mechanism for feeding the tape past a processing area and storing a predetermined length of such tape so that it may be retracted and the first character in the tape restored to its original position and then the tape may be re-run through the apparatus. Such apparatus has great utility where tape readers operating at high speed are used in connection with error detecting apparatus or where it is desired to repeatedly transmit a portion of a telegraphic message.

It is an object of the present invention to provide an apparatus for feeding an intelligence bearing tape past a processing point at one rate of speed and then retracting it at a different rate of speed to restore the first character which had been moved past the processing point to its original position.

Another object of the invention is to provide a tape reader capable of feeding a predetermined length of tape past a tape sensing point and then retracting the tape to restore the first character read at the sensing point to position at the sensing point.

A still further object of the invention is to provide a tape reader for reading information from intelligence bearing tape wherein a predetermined length of tape which has been fed past the reader section of the apparatus may be retracted and automatically stopped with the first character previously sensed in position to be sensed again.

More broadly speaking the object of the present invention is to provide an apparatus for handling intelligence bearing tape at very high speeds and one which is capable of retracting the tape which has been fed past a processing point at a speed well in excess of the speed at which it was fed forward.

In accordance with one embodiment of the invention individually actuatable feed wheels are provided in spaced relation to one another whereby upon operation of one of the feed wheels, tape will be fed out of the apparatus whereas operation of a second of the feed wheels, while the first feed wheel is not operating, will result in the feeding of a predetermined length of the tape to a storage area between the two feed wheels, which portion or length of tape may be retracted past the second of the feed wheels at high speed by engaging a high speed roller with the tape to draw the tape back to the position where the first character in the portion which has been fed by the second wheel will be restored to position to be re-read. A taut tape detector positioned between the two feed wheels is operated by the tape when the tape is drawn taut between the first and second wheels to interrupt the operation of the tape retracting means. This taut tape detector also serves to interrupt the operation of the first mentioned feed wheel which feeds the tape out of the apparatus. A tape out switch is also provided in the apparatus for interrupting the operation of the tape sensing mechanism and the second mentioned feed wheel. Both of these mechanisms are also disabled when the mechanism for retracting the tape is in operation.

A better understanding of the invention may be had from the following detailed description when considered in conjunction with the accompanying drawings wherein.

Figures 1, 2, 5:
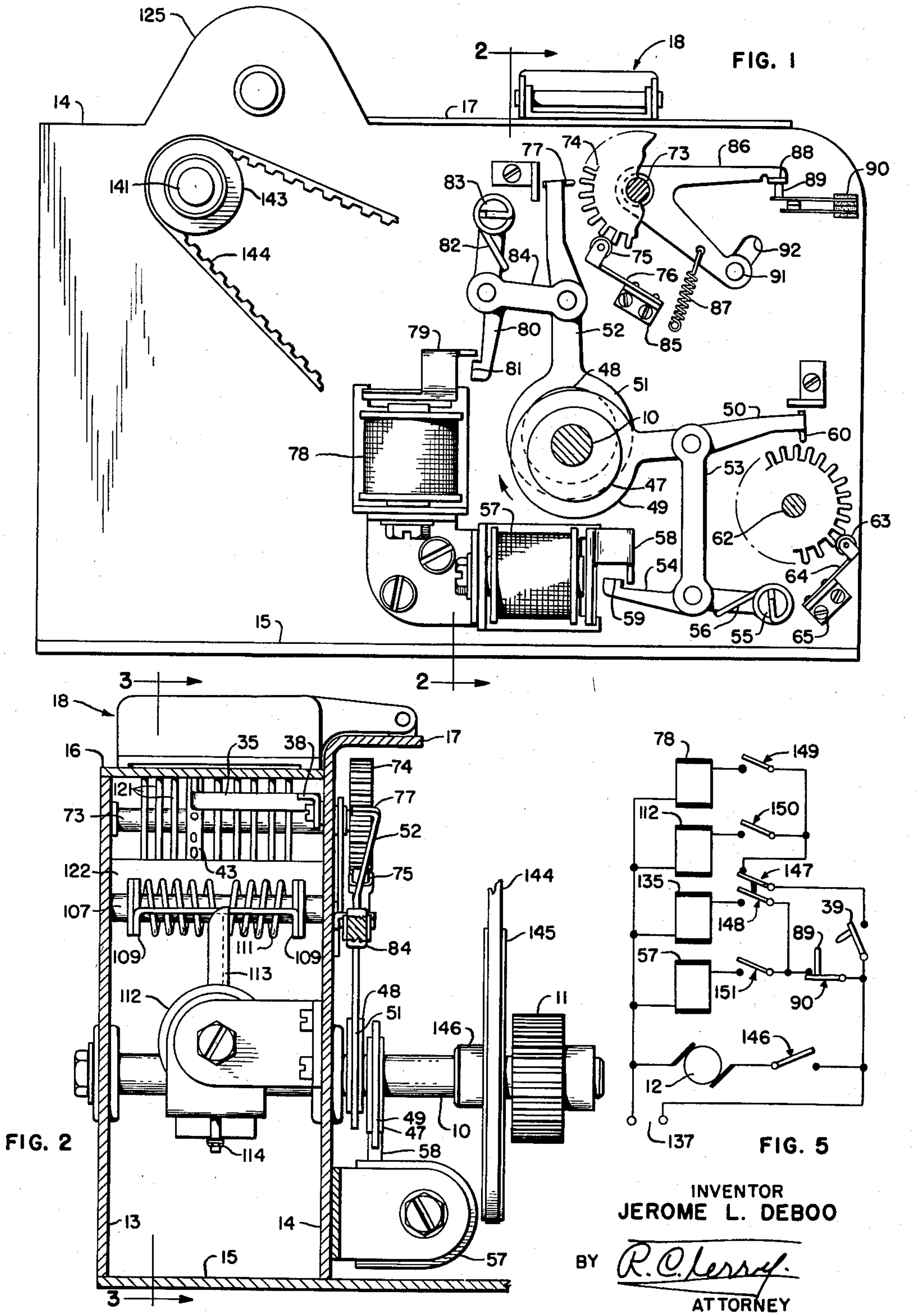
FIG. 1 is a rear view of the apparatus.
FIG. 2 is a vertical sectional view taken substantially along the line 2—2 of FIG. 1, in the direction of the arrows.
FIG. 5 is a circuit diagram showing the various electrical connections of the apparatus.
Figures 3, 4:
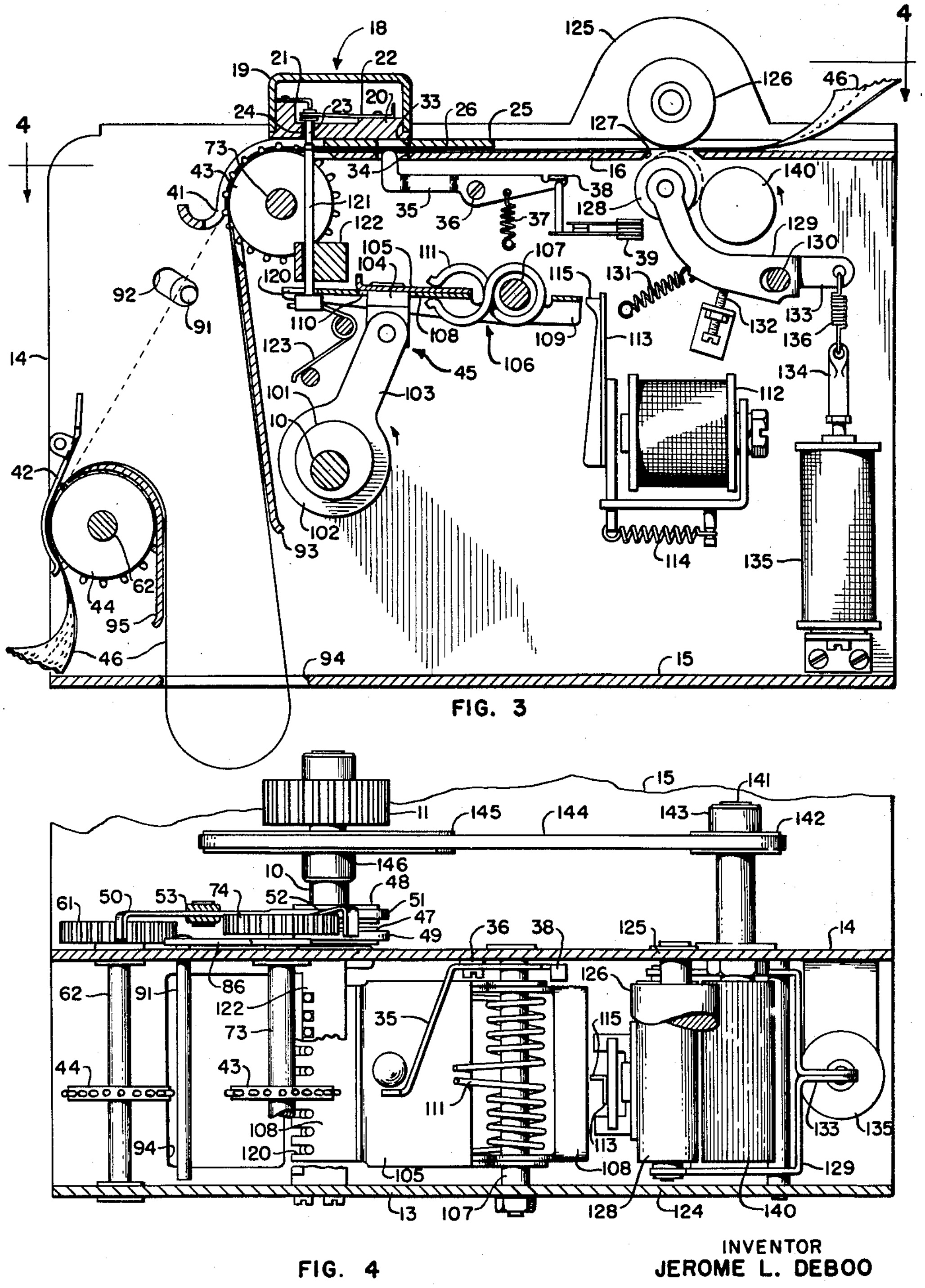
FIG. 3 is a longitudinal sectional view taken substantially along the line 3—3 of FIG. 2 in the direction of the arrows.
FIG. 4 is a longitudinal sectional view taken substantially along the line 4—4 of FIG. 3 in the direction of the arrows and showing in substance a plan view of the apparatus with the top of the apparatus removed.

Referring now to the drawings wherein like reference numerals designate the same parts throughout the several views, it will be seen by reference to FIGS. 2 and 4 that the apparatus is provided with a main drive shaft 10 having fixed thereto a drive pulley 11 which is driven by suitable belting (not shown) in turn driven by a motor 12 (FIG. 5). The drive shaft 10 is mounted for rotation in a pair of side plates 13 and 14 which in turn are mounted upon a base plate 15. Adjacent their upper ends, the side plates 13 and 14 are attached in a suitable manner to a top plate 16. The side plate 14 is bent over at its upper end to provide a horizontally disposed portion 17 which has pivotally connected to it a contact box 18.

As shown most clearly in FIG. 3 the contact box 18 has a cover 19 which is cup shaped in cross section and has fixed to it, adjacent its bottom, a block 20 of insulating material. There are a plurality of stationary contacts 21 mounted on the block 20 for cooperation with a plurality of movable contacts 22 also mounted on the block 20. Each of the movable contacts 22 has associated with it an actuator pin 23 which is freely mounted within an aperture 24 in the block 20. The actuator pins 23 have heads formed on them to prevent them from dropping through the aperture 24 and when they are individually actuated they will close contact between the movable contact 22 and the stationary contact 21 to close circuits to information utilizing apparatus not shown but associated with the tape reader being described herein.

The block 20 of insulating material and the cover 19 are mounted on a contact box supporting plate 25 which serves the dual purpose of supporting the contact box 18 and defining a tape slot 26 in cooperation with the top plate 16.

An aperture 33 formed in the supporting plates 25 is in direct alignment with an aperture 34 formed in the top plate 16 for receiving the tip of a tape out lever 35 when there is no tape in the tape slot 26 at the point where the apertures 33 and 34 are formed. The tape out lever is suitably mounted on a pivot screw 36 fitted into the side plate 14. A contractile spring 37 normally urges the tape out lever 35 to rock in a clockwise direction from the position shown in FIG. 3. At its right-hand end the tape out lever 35 has a horizontally disposed bent portion 38 which will hold a switch 39 closed when there is tape in the tape slot but will open the switch 39 whenever the tape out lever 35 is permitted to rock clockwise from the position shown in FIG. 3.

The shaft 10 furnishes the power for driving two tape feed wheels 43 and 44, against which the tape is held by pressure members 41 and 42 respectively, and a tape sensing mechanism designated generally by the numeral 45 to feed a tape 46 from a suitable supply source through the tape slot 26. The tape feeding and tape sensing mechanism are of the type disclosed in detail and claimed in the copending application of W. J. Zenner, Serial No. 656,045, filed April 30, 1957, now Patent No. 2,924,452, and J. L. De Boo, Serial No. 656,059, also filed April 30, 1957. Therefore, these mechanisms will be described herein only insofar as it is necessary to understand their operation in connection with other elements of the apparatus.

The shaft 10 carries an eccentric 47 for driving the tape wheel 44 and eccentric 48 for driving the tape wheel 43. A ring 49 formed integrally or suitably connected to a pawl 50 encircles the eccentric 47 and a ring 51 suitably attached to or formed integrally with a pawl 52 encircles the eccentric 48. Thus upon rotation of crank shaft or main shaft 10 the eccentrics 47 and 48 will impart operation to the pawls 50 and 52.

Intermediate its ends the pawl 50 is pivotally attached to a link 53 which is in turn pivoted on a blocking lever 54. The blocking lever 54 is mounted for oscillation on a pivot pin 55 and is urged to rotate in a clockwise direction by a spring 56 which encircles the pivot pin 55, is attached thereto and bears against an edge of the blocking lever. An electromagnet 57 has associated with it an armature 58, which is normally urged to the position shown in FIG. 1, but which upon energization of the electromagnet, will be moved over the path of a shoulder 59 on the left end of the blocking lever 54. When the electromagnet 57 is in its de-energized condition the pawl 50 will be oscillated in such a manner once in each revolution of the shaft 10 that the shoulder 59 will be moved down below the edge of the armature 58. Consequently, when the electromagnet 57 is energized the edge of its armature will be moved into the path of the shoulder 59 and will block upward movement of the blocking lever 54 thus to change the path of oscillation of the pawl 50.

When the electromagnet 57 is energized the right end of the pawl 50 will carry a tooth engaging portion 60, formed on its right end, into engagement with the teeth of a toothed driving member 61. The toothed driving member 61 is fixed to a shaft 62 on which the feed wheel 44 is also fixed. This shaft 62 is journaled in the side plates 13 and 14 so that it supports the tape feed wheel 44 between the side plates 13 and 14. A spring pressed detent roller 63 is suitably mounted on the side plate 14 to engage the toothed wheel 61 and prevent accidental displacement of it. The detent 63 is carried on a spring 64 which is in turn mounted on a block 65 and the spring 64 is sufficiently strong to prevent an accidental displacement of the toothed wheel 61 but not strong enough to interfere with its operation by the pawl 50.

The feed wheel 43 is fixed to shaft 73 which is in turn journaled in the side plates 13 and 14 and extends out through the plate 14 to accommodate a toothed driving member 74. The toothed driving member 74 has a detent roller 75 associated with it to prevent accidental displacement of it. The detent member 74 is carried upon a spring 76 mounted on a block 85 which is in turn attached to the outer surface of the side plate 14. The pawl 52 has a tooth engaging portion 77 which upon energization of a control electromagnet 78 will engage with and drive the toothed driving member 74. An armature 79 of the electromagnet 78 is movable, upon energization of the electromagnet 78, into position to block the oscillation of a blocking lever 80 by engaging a shoulder 81 on the free end of the blocking lever 80. The blocking lever 80 is normally urged to rotate in a clockwise direction by a spring 82 which is fixed to a pivot pin 83 which pivotally supports the blocking lever 80. A link is pivotally connected to the blocking lever 80 and to the pawl 52 whereby when the armature 79 is not attracted by its associated electromagnet 78, the link 84 will oscillate the blocking lever 80 without actuating the feed wheel 74. However when the electromagnet 78 is energized, and its armature 79 consequently attracted toward it, the armature 79 will move into the path of the shoulder 81 thus to block oscillation of the blocking lever 80 and thereby cause the tooth engaging portion 77 of the pawl 52 to engage with and drive the toothed driving member 74.

Mounted on the shaft 73 for oscillation thereabout is a bell crank lever 86 which is normally urged to the position shown in FIG. 1 by a contractile spring 87. The horizontally disposed arm of the bell crank lever 86 has a projection 88 on it which is aligned with a pin 89 that will open a contact pair 90 when the bell crank lever 86 is oscillated counterclockwise from the position shown in FIG. 1. The diagonally disposed arm of the bell crank lever 86 carries a pin 91 which extends through a slot 92 in the side wall 14 and into position to be engaged by a tape 46 which is drawn taut between the feed wheel 43 and feed wheel 44. Thus when the tape 46 is drawn taut between the feed wheel 43 and the feed wheel 44 the bell crank lever 86 will be rocked counterclockwise against the action of its spring 87 to effect the opening of the contact pair 90 shown in FIG. 5.

A pair of tape guide plates 95 and 93 are so disposed with respect to the feed wheels 44 and 43 respectively as to form a storage bin between these two feed wheels. The base plate 15 has an aperture 94 formed in it through which a tape 46 which has been fed by the feed wheel 43 and not yet fed by the wheel 44, may pass so that a relatively large quantity of tape may be stored between these two feed wheels.

A tape sensing mechanism which, as pointed out herein before, is claimed in the copending application of J. L. De Boo referred to hereinbefore is also driven by the shaft 10. The shaft 10 has an eccentric 101 mounted on it and a ring 102 surrounds the eccentric 101 and is formed integrally with a crank arm 103. The upper end of the crank arm 103 (FIG. 3) is pivoted on a bracket 104 which is in turn fixed to a top plate 105 of a two part lever assemblage designated generally by the number 106. The top plate 105 of the lever assemblage 106 is oscillatably mounted on a shaft 107 and will be rocked about the shaft 107 any time the shaft 10 is rotated. A bottom plate 108 of the assemblage 106 has downwardly extending sides 109 formed on it to impart rigidity to it and this plate 108 is also pivotally mounted on the shaft 107 which is in turn mounted between the side plates 13 and 14. The bottom plate 108 has an aperture 110 formed in it through which the bracket 104 may freely pass whereby the bottom plate may be blocked in its movement while the top plate oscillates, although the top plate 105 and bottom plate 108 are normally held together as a unit by a spring 111 which encircles the shaft 107 and has portions bearing on the upper surface of the top plate 105 and on the bottom surface of the bottom plate 108. An electromagnet 112 has an armature 113 associated with it which is normally urged to rock in a counterclockwise direction by a coil spring 114 into a position where a latching portion 115 on the armature 113 will move into the path of the bottom plate 108 and block its movement unless the electromagnet 112 is energized.

The left end (FIG. 3) of the bottom plate 108 has a series of slots 120 formed in it through which the shanks of sensing pins 121 freely pass. These sensing pins 121 are guided by a pin block 122 and are individually urged by springs 123 to follow the bottom plate 108. There is provided one pin 121 for each actuator pin 23. When the sensing pins 121 are moved upwardly under the influence of their individual springs 123, upon oscillation of the bottom plate 108, the sensing pins will either engage the tape if it is imperforate in the area associated with them or will pass through apertures in the tape. Those sensing pins 121 which pass through apertures in the tape 46 will actuate the actuator pins 23 associated with them. Thus each time the shaft 110 is rotated and through operation of crank arm 103 oscillates the bottom plate 108 the sensing pins 121 will all be permitted to move upwardly under the influence of their respective springs 123 to actuate the contacts 22 in the contact box 18 and read any information which has been perforated into the tape in the form of apertures or imperforate areas in the tape 46.

The side plates 13 and 14 have upwardly extending projections 124 and 125, respectively, formed on them which serve to support a roller 126 for free rotation. The roller 126 bears on the upper surface of the tape 46 and will rotate with the tape when the tape is moved to the right or to the left (FIG. 3). Directly below the roller 126, an aperture 127 is formed in the top plate 16 through which a roller 128 may freely pass. The roller 128 is mounted on a U shaped lever 129 (FIGS. 3 and 4), adjacent the free end of the lever 129. The lever 129 is slidably and oscillatably mounted on a pivot pin or shaft 130 that extends from side to side of the apparatus and is supported by the side plates 13 and 14. The lever 129 is normally urged to assume the position shown in FIG. 3 by a contractile spring 131 which tends to rock the lever 129 counterclockwise about the pivot pin 130 and down into engagement with an adjustable stop member 132. Projecting from the base of the U shaped lever 129 is an arm 133 which is attached to a plunger 134 of a solenoid 135 by a spring 136. The spring 136 is appreciably stronger than the spring 131 and when the solenoid 135 is energized the spring 136 will move the lever 129 against the action of the spring 131. When the solenoid 135 is energized the lever 129 will be resiliently urged to carry the roller 128 into engagement with bottom surface of the tape 46 and to pinch the tape between the roller 128 and the roller 126 both of which are freely rotatable. In addition to engaging the under surface of the tape when the solenoid 135 is energized, the roller 128 will be carried into engagement with a continuously rotating roller 140 which is mounted upon a shaft 141 that extends through the plates 13 and 14 and extends outwardly beyond the plate 14 to support a small pulley 142 which is fixed to it by means of a collar 143. This small pulley 142 is designed to be driven by a belt 144 which passes around the pulley 142 and around a large pulley 145 fixed to the shaft 10 by means of a collar 146. The pulleys 145 and 142 are so arranged that the roller 140 will be driven at a very high speed in a counterclockwise direction. Consequently, when the roller 128 is moved up to engage the under surface of the tape 46 and to push it up until its upper surface is in tight engagement with the roller 126, the roller 128 will also engage the roller 140 and will be driven in a clockwise direction by the roller 140 at a high rate of speed to pinch the tape between rollers 126 and 128 and retract it to the right at high speed.

In the operation of the apparatus the motor 12 is started by closing a switch 146 which will connect a power source at 137 to the motor to energize it (FIG. 5). With the motor running and the electromagnet 57, 78 and 112 and solenoid 135 de-energized a tape may be inserted into the apparatus by feeding it through the tape slot 26 and around the feed wheel 43. When a tape is so positioned the tape out lever 35 will be rocked counterclockwise against the urging of the contractile spring 37 and as a result will close the switch 39 (FIGS. 3 and 5). The closing of the switch 39 will condition the electromagnets 112 and 78 for subsequent operation by connecting one side of the power source 137 through the switch 39 and normally closed contact pair 147 of a switch 148. The switch 148 is a tape retraction control switch which is maintained in the position shown in FIG. 5 at all times except when the tape is being retracted to the right (FIG. 3). With the switch 148 in the position shown in FIG. 5 either one or both of the electromagnets 78 and 112 may be energized by closing their respective switches 149 or 150. In the ordinary operation of the apparatus both of the switches 149 and 150 are closed at the same time so that at any time the feed wheel 43 is being driven due to energization of its associated electromagnet 78 the tape sensing mechanism 45 will also be activated by energization of its electromagnet 112. If the tape sensing mechanism 45 and the tape feeding wheel 43 are both operating and the tape feeding wheel 44 is not operating a loop of tape 46 will be fed into position between the tape feed wheels 44 and 43 and will be guided downwardly by the guide plates 93 and 95 to form a loop which may extend through the aperture 94.

If it is desired to operate the tape feed wheel 44 simultaneously with the tape feed wheel 43 this action may be effected by first closing the switches 149 and 150 to start the tape sensing mechanism and tape wheel feed 43 into operation and thereafter closing a switch 151 which will supply power through the normally closed contact pair 90 which is not open at this time because the tape 46 is not drawn taut between the tape feeding wheels 43 and 44. Thus with the switches 149, 150, and 151 closed tapes may be fed past the sensing pins 121 and be fed out of the apparatus by the tape feed wheel 44 and read continuously while maintaining a loop of tape 46 as shown in FIG. 3.

Another mode of operation of the apparatus would comprise feeding a length of tape past the sensing devices and reading it while maintaining the tape feed wheel 44 inoperative thus to feed a loop of any selected length into position between the tape guide plates 95 and 93. Thereupon the sensing mechanism 45 and the feed wheel 43 may be stopped and the tape which has been looped into the storage area may be withdrawn from the apparatus by actuating the tape wheel feed 44. This may be effected by opening the switches 149 to 150 and closing the switch 151. Once this type of operation is performed the tape will feed out of the apparatus until it is taut between the feed wheels 43 and 44 whereupon the taut tape detecting pin 91 will be moved to a position where it will open the contact pair 90. When the contact pair 90 is opened the circuit from the power source 137 to the electromagnet 57 will be interrupted at the contact pair 90.

After the just described operation a new length of tape may be fed into position between the feed wheels 43 and 44 by opening the switch 151 and closing the switches 150 and 149. The loop of tape just fed into position between the guide plates 92 and 93 may either be fed out of the apparatus as described hereinbefore or retracted to its original position by operating the switch 148 which will open its contact pair 147 to disconnect the power source 137 from the electromagnets 78 and 112 and to connect the power source at 137 through the normally open contact pair of switch 148 to the solenoid 135. When the solenoid 135 is energized it will move the roller 128 up to pinching engagement with the roller 140 and will pinch the tape between the idler roller 126 and roller 128. The roller 128 of course will be driven rapidly in a clockwise direction and will rapidly pull tape 46 back to its original position until the tape is taut between the tape feed wheels 43 and 44 at which point the taut tape detecting pin 91 will be operated and will open the contact pair 90 to break the circuit to the solenoid 135.

Obviously the switches 151, 148, 150 and 149 may be operated in any desired sequence by a control apparatus positioned remotely from the tape reader described hereinbefore and the apparatus may be used to retransmit a portion of the message in a printing telegraph system or may be used to pull back and retransmit a section of a message where the device is used in data processing apparatus particularly such apparatuses as those provided with error detection and correction mechanisms where it is desired to pull a stored tape back to the first character of a "blockette" of intelligence bearing tape if an error has been detected.

While a specific embodiment of the invention has been described hereinbefore it will be understood that the various embodiments thereof may be made without departing from the spirit of the invention.

What is claimed is:

1. An apparatus for handling intelligence bearing tape comprising a constantly rotating shaft; sensing means for reading information from said tape; means driven by said shaft for actuating said sensing means; means for rendering said last-mentioned means effective; a first tape feeding wheel for feeding tape out of said apparatus; a first wheel driving means driven by said shaft; selectively operable means for rendering said first wheel driving means effective to impart intermittent rotation to said first wheel; a second tape feeding wheel spaced from said first wheel; a second wheel driving means driven by said shaft; means selectively operable for rendering said second wheel driving means effective to impart intermittent rotation to said second wheel; a storage means intermediate said wheels for storing a length of tape between said wheels; a tape retracting means operable when said wheel driving means are not being operated for retracting the tape which has been fed by said second wheel toward said first wheel including a constantly driven element and means for transmitting motion from said element to the tape; and a taut tape detector positioned to be operated by a tape held taut between said feeding wheels and operable to stop operation of said first wheel and said tape retracting means when the tape which had been in the storage means is drawn taut between the two feeding wheels.

2. An apparatus for handling intelligence bearing tape comprising a constantly rotating shaft; sensing means for reading information from said tape; means driven by said shaft for actuating said sensing means; means for rendering said last-mentioned means effective; a first tape feeding wheel for feeding tape out of said apparatus; a first wheel driving means driven by said shaft; means selectively operable for rendering said first wheel driving means effective to impart intermittent rotation to said first wheel; a second tape feeding wheel spaced from said first wheel; a second wheel driving means driven by said shaft; means selectively operable for rendering said second wheel driving means effective to impart intermittent rotation to said second wheel; a tape retracting means for retracting the tape which has been fed by said second wheel toward said first wheel including a constantly driven element, means operable when the means for rendering the wheel driving means effective are not selected for operation for transmitting motion from said element to the tape, and a taut tape detector positioned to be operable to stop operation of said first wheel and said tape retracting means.

3. An apparatus for handling intelligence bearing tape comprising a constantly rotating shaft; sensing means for reading information from said tape; means driven by said shaft for actuating said sensing means; means for rendering said last-mentioned means effective; a first tape feeding wheel for feeding tape out of said apparatus; a first wheel driving means driven by said shaft; means selectively operable for rendering said first wheel driving means effective to impart intermittent rotation to said first wheel; a second tape feeding wheel spaced from said first wheel; a second wheel driving means driven by said shaft; means selectively operable for rendering said second wheel driving means effective to impart intermittent rotation to said second wheel; a tape retracting means for retracting the tape which has been fed by said second wheel toward said first wheel including a constantly driven roller, an idler roller bearing against one surface of the tape, a second idler roller movable to engage with the other surface of the tape and with the constantly driven roller, and means operable when both of said means for rendering the wheel driving means effective are not selected for operation for moving said second idler roller into engagement with the tape and constantly driven roller; and a taut tape detector positioned to be operated by a tape held taut between said feeding wheels and operable to stop operation of said first wheel and saia tape retracting means.

4. An apparatus for handling intelligence bearing tape comprising a constantly rotating shaft having a plurality of driving eccentrics on it; sensing means for reading information from said tape; means driven by one of said eccentrics on said shaft for actuating said sensing means; means for rendering said last-mentioned means effective; a first tape feeding wheel for feeding tape out of said apparatus; a first wheel driving means driven by a second one of said eccentrics on said shaft; means for rendering said first wheel driving means effective to impart intermittent rotation to said first wheel; a second tape feeding wheel spaced from said first wheel; a second wheel driving means driven by a third one of said eccentrics on said shaft; means for rendering said second wheel driving means effective to impart intermittent rotation to said second wheel either simultaneously with or independently of said means for rendering the first wheel driving means effective; a tape retracting means for retracting the tape which has been fed by said second wheel toward said first wheel including a constantly driven roller, an idler roller bearing against one surface of the tape, a second idler roller movable to engage with the other surface of the tape and with the constantly driven roller, and means operable when neither of said means for rendering the driving means is in operation for moving said second idler roller into engagement with the tape and constantly driven roller; a taut tape detector positioned to be operated by a tape held taut between said feeding wheels and operable to stop operation of said first wheel and said tape retracting means; and means for interrupting the operation of the second wheel driving means including a sensing element urged against the tape at a predetermined point in the apparatus and movable when no tape is present at said position to render the second wheel driving means and the tape sensing means ineffective.

5. In an apparatus for handling intelligence-bearing tape, a tape-feed sprocket, means for rotating said sprocket step-by-step, means for activating and deactivating said sprocket rotating means, means for confining the tape in engagement with said sprocket, tape engaging means spaced from said sprocket in the direction of movement of the tape for holding the tape stationary to cause the formation of a loop of tape during periods of operation of the sprocket, continuously driven means selectively operable when said sprocket rotating means is not activated for causing the tape to be moved in the opposite direction while remaining in engagement with the sprocket and accompanied by rotation of the sprocket in a correspondingly opposite direction, and means for limiting the opposite movement of the tape to a distance equal to the length of the loop between the sprocket and the tape engaging means.

6. In an apparatus for handling intelligence bearing tape, a first tape-feed sprocket for feeding tape out of the apparatus, means for maintaining the tape in driving engagement with said first tape-feed sprocket, a second tape-feed sprocket for feeding tape toward said first tape-feed sprocket, means for maintaining the tape in driving engagement with said second sprocket, means for activating said first sprocket to feed tape out of the apparatus, means for activating said second sprocket in a predetermined direction to feed a loop of tape toward said first sprocket, and continuously driven means selectively operable when said second sprocket is not being activated in the predetermined direction for drawing said loop of tape back past said second sprocket in one continuous movement while the tape is maintained in driving engagement with said second sprocket whereby the tape drives said second sprocket in a direction opposite to said predetermined direction.

(References on following page)

References Cited in the file of this patent

UNITED STATES PATENTS

| | | |
|---|---|---|
| 1,174,236 | Dixon | Mar. 7, 1916 |
| 1,941,916 | Rothermel | Jan. 2, 1934 |
| 2,172,754 | Lasker | Sept. 12, 1939 |
| 2,384,194 | Potts | Sept. 4, 1945 |
| 2,687,883 | Pettus | Aug. 31, 1954 |
| 2,756,273 | Wampach | July 24, 1956 |
| 2,792,217 | Weidenhammer | May 14, 1957 |
| 2,816,161 | Glaser | Dec. 10, 1957 |
| 2,831,678 | MacNeill | Apr. 22, 1958 |
| 2,833,538 | Namenyi-katy | May 6, 1958 |